United States Patent
Epstein et al.

(10) Patent No.: US 11,363,632 B2
(45) Date of Patent: Jun. 14, 2022

(54) FREQUENCY DIVISION DUPLEX DEVICE AND METHOD FOR USE IN A WIRELESS NETWORK

(71) Applicant: HUAWEI TECHNOLOGIES CO., LTD., Shenzhen (CN)

(72) Inventors: Leonid Epstein, Munich (DE); Shimon Shilo, Hod Hasharon (IL); Avi Weitzman, Hod Hasharon (IL); Genadiy Tsodik, Hod Hasharon (IL); Doron Ezri, Hod Hasharon (IL); Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/887,820

(22) Filed: May 29, 2020

(65) Prior Publication Data
US 2020/0344801 A1 Oct. 29, 2020

Related U.S. Application Data

(63) Continuation of application No. PCT/EP2017/081161, filed on Dec. 1, 2017.

(51) Int. Cl.
*H04W 74/08* (2009.01)
*H04W 72/04* (2009.01)
(Continued)

(52) U.S. Cl.
CPC ... *H04W 74/0808* (2013.01); *H04W 72/0453* (2013.01); *H04W 72/1273* (2013.01); *H04W 80/02* (2013.01); *H04W 84/12* (2013.01)

(58) Field of Classification Search
CPC ......... H04W 74/0808; H04W 72/0453; H04W 72/1273; H04W 80/02; H04W 84/12; H04L 27/2602
See application file for complete search history.

(56) References Cited

U.S. PATENT DOCUMENTS

| | | | |
|---|---|---|---|
| 2015/0078215 A1* | 3/2015 | Zhou | H04L 47/14 370/277 |
| 2015/0229461 A1 | 8/2015 | Difazio et al. | |

(Continued)

FOREIGN PATENT DOCUMENTS

| | | |
|---|---|---|
| EP | 3188431 A2 | 7/2017 |

OTHER PUBLICATIONS

IEEE P802.11; Mise for Trigger frame format; Asterjadhi et al. Qualcomm; doc.: IEEE 802.11-17/1264r0; Aug. 21, 2017. (Year: 2017).*

(Continued)

*Primary Examiner* — Hassan A Phillips
*Assistant Examiner* — Mohammed S Chowdhury
(74) *Attorney, Agent, or Firm* — Leydig, Voit & Mayer, Ltd.

(57) ABSTRACT

A device on a wireless network generates duration data for determining a duration of a time interval. A transmission is then instructed, by the device, to transmit the duration data and a downlink payload including an aggregated Media Access Control (MAC) layer data unit, the downlink payload being transmitted on first subcarriers. The transmission also includes a trigger that configures the at least one other device on the network to transmit an uplink payload within the time interval, and during at least part of the transmission of the downlink payload, on second subcarriers that are at different frequencies to the first subcarriers.

14 Claims, 9 Drawing Sheets

(51) Int. Cl.
*H04W 72/12* (2009.01)
*H04W 80/02* (2009.01)
*H04W 84/12* (2009.01)

(56) References Cited

U.S. PATENT DOCUMENTS

| | | | | |
|---|---|---|---|---|
| 2016/0165589 | A1* | 6/2016 | Chu | H04W 4/06 370/329 |
| 2017/0019218 | A1 | 1/2017 | Sadeghi et al. | |
| 2017/0142702 | A1* | 5/2017 | Yu | H04W 72/0406 |
| 2017/0279864 | A1* | 9/2017 | Chun | H04L 27/2602 |
| 2017/0325247 | A1* | 11/2017 | Itagaki | H04W 74/08 |
| 2018/0007661 | A1* | 1/2018 | Chun | H04L 1/1861 |
| 2018/0091284 | A1* | 3/2018 | Min | H04L 5/0037 |
| 2018/0227917 | A1* | 8/2018 | Li | H04W 72/0413 |
| 2019/0045513 | A1* | 2/2019 | Chu | H04L 5/0055 |
| 2019/0089519 | A1* | 3/2019 | Nabetani | H04L 1/1896 |

OTHER PUBLICATIONS

Ergen "Mobile Broadband: Including WiMAX and LTE; Chapter 2: Basics of Cellular Communication," Total 4 pages, XP002783134, Springer, Berkeley, CA, USA (Jan. 2009).

Coleman et al., "CWNA: Certified Wireless Network Administrator Official Study Guide: Exam CWNA-106," Fourth Edition, Total 3 pages, XP002783137, John Wiley & Sons, Inc., Indianapolis, Indiana, USA (Jan. 2014).

"Draft Standard for Information technology—Telecommunications and information exchange between systems Local and metropolitan area networks—Specific requirements—Part 11: Wireless LAN Medium Access Control (MAC) and Physical Layer (PHY) Specifications—Amendment 6: Enhancements for Higher Efficiency WLAN," in IEEE P802.11ax/D2.0, pp. 1-596, Institute of Electrical and Electronics Engineers, New York, New York (Oct. 2017).

"IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012), pp. 1-3534, Institute of Electrical and Electronics Engineers, New York, New York (Dec. 2016).

"IEEE Standard for Information technology—Telecommunications and information exchange between systems Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHz," in IEEE Std 802.11ac-2013, pp. 1-425, Institute of Electrical and Electronics Engineers, New York, New York (Dec. 2013).

"IEEE Standard for Information technology—Telecommunications and information exchange between systems Local and metropolitan area networks—Specific requirements—Part 11: Wireless LAN Medium Access Control (MAC) and Physical Layer (PHY) Specifications—Amendment 5: Enhancements for Higher Throughput," in IEEE Std 802.11n-2009, pp. 1-536, Institute of Electrical and Electronics Engineers, New York, New York (Sep. 2009).

* cited by examiner

FREQUENCY DIVISION DUPLEX DEVICE AND METHOD FOR USE IN A WIRELESS NETWORK

CROSS-REFERENCE TO RELATED APPLICATIONS

This application is a continuation of International Application No. PCT/EP2017/081161, filed on Dec. 1, 2017, the disclosure of which is hereby incorporated by reference in its entirety.

FIELD

The present disclosure, in some embodiments thereof, relates to a device, method and program product for use in a wireless network, more specifically in some embodiments, a Wireless Local Area Network (WLAN).

BACKGROUND

Wi-Fi protocols (defined by the IEEE 802.11 suite of standards, herein referred to as 802.11) are popularly employed by many modern devices for WLAN communication. The 802.11 standard was originally developed for relatively low bitrates where overhead of the physical layer (PHY) preamble, channel access time, and in-band acknowledgement were negligible relative to payload transmission time. With the progress of the PHY technology, the payload transmission time for a given amount of data has been significantly reduced, for example due to faster bit rates and wider bandwidth transmissions, but time taken to transmit the PHY preamble has grown, both in absolute time and relative to the transmission time. Further, newer Wi-Fi PHY must still include a legacy preamble for back-compatibility.

One way to improve the efficiency of Wi-Fi protocols is to increase the amount of data transmitted under the same PHY preamble. This has led to the use of aggregated Media Access Control (MAC) layer data units, i.e. aggregated MAC Protocol Data Units (A-MPDUs) and/or aggregated MAC Service Data Units (A-MSDUs). However, the amount of improvement provided by A-MPDUs is limited by an aggregation delay—the more data that is aggregated, the longer the delay. Large A-MPDUs may therefore not be tolerated by delay-sensitive applications such as in virtual reality and gaming.

IEEE 802.11ax sets out a High Efficiency Wireless Local Area Network (HE) protocol that uses Orthogonal Frequency Divisional Multiple Access (OFDMA). OFDMA splits channel bandwidth between several downlink or uplink users. Each user is assigned a lower PHY data rate (compared with having the whole bandwidth dedicated to the user). This increases per user transmission time for the same amount of data. Thus, for that use, there is a reduced percentage of time dedicated to overhead. This improves network utilization and aggregate throughput for multiple users, considered as a whole.

However, with ever increasing throughput demands, there continues to be a need for new and efficient solutions.

SUMMARY

The present disclosure provides a new apparatus, a system, and/or computer program product for communicating in a wireless network, using first subcarriers for a downlink payload and second subcarriers for an uplink payload.

In a first aspect of the present disclosure, there is provided a device for use in a wireless network. The device comprises at least one processor adapted to generate duration data for determining a duration of a time interval. The at least one processor is further adapted to instruct a transmission, via the network, of: the duration data; a downlink payload and a trigger. The downlink payload comprises an aggregated MAC layer data unit, the downlink payload being transmitted on first subcarriers. The trigger configures at least one other device on the network to transmit an uplink payload within the time interval, and during at least part of the transmission of the downlink payload, on second subcarriers that are at different frequencies to the first subcarriers. Thus, the downlink payload comprises the aggregated MAC layer data unit and the uplink payload may be transmitted in frequency division duplexing (FDD) communication.

In some embodiments, the instructed transmission transmits information for identifying, to the at least one other device, when to commence an uplink transmission including the uplink payload. The information may be some or all of the duration data.

In some embodiments, the trigger is transmitted in a first frame, the first frame spanning a bandwidth that includes the first and second subcarriers. By spanning the bandwidth, the first frame may set up network protection for the FDD communication.

In some embodiments, a Wireless Local Area Network legacy preamble is transmitted, in the first frame, across a bandwidth that includes the first and second subcarriers. Thus protection can be provided from the devices that operate in the channels used for transmission of the legacy preamble.

In some embodiments, the trigger is transmitted in a first frame and the downlink payload is transmitted in a second frame that is spaced after the first frame. Such embodiments allow for the use of a trigger MPDU to trigger transmission of the uplink payload. In some embodiment, the trigger is included in a High Efficiency WLAN (HE) Trigger Frame. The triggered uplink payload may be transmitted during transmission of the second frame that is spaced after the first frame. The first frame may include an aggregated MAC Protocol Data Unit that includes the trigger. This allows the first frame to transmit more payload information than just the MPDU, which may further improve utilization of the communication overhead.

In some embodiments, the first subcarriers and the second subcarriers are selected to be separated to provide a guard channel between uplink and downlink transmissions. This may reduce interference between the uplink and downlink transmissions.

In some embodiments, the at least one processor is further adapted to receive an uplink frame comprising the triggered uplink payload concurrently with transmitting a downlink frame comprising the downlink payload. Concurrent transmission and reception can maximize time overlap of the downlink and uplink transmissions, which in some embodiments may improve efficiency.

In some embodiments, the subcarriers are used as OFDM tones in the transmission of the downlink payload and in the transmission of the uplink payload, wherein the first subcarriers is a first plurality of subcarriers and the second subcarriers is a second plurality of subcarriers. Having a plurality of subcarriers carrying a payload can be particularly beneficial behavior in a high-reflection environment, such as indoors, and is also beneficial in being consistent with current Wi-Fi.

In some embodiments, the duration data comprises at least one of a first duration indicator and a second duration indicator. The first duration indicator is for identifying a duration of a first downlink frame. The second duration indictor is for identifying a duration to be reserved after the first downlink frame for at least one further frame to be communicated between the device and the at least one other device.

In some embodiments, the at least one processor is further adapted to instruct transmission of transmission initiation data that indicates a Wireless Local Area Network frame is being transmitted. The frame includes the trigger, and the transmission initiation data is transmitted in a Wireless Local Area Network legacy preamble. This can be used to initiate protection of the medium for the communication, by devices that can interpret the legacy preamble.

In some embodiments, generating the duration data comprises calculating at least one of a size of a downlink frame comprising the downlink payload and a size of an uplink frame comprising the uplink payload. Generating the duration data may comprise at least one of: calculating a size of the uplink frame; and calculating a size of a downlink frame comprising the trigger.

In some embodiments, the aggregated MAC layer data unit is an aggregated MAC Protocol Data Unit (A-MPDU). The use of A-MPDUs can be particularly suited to efficient use of a WLAN communication.

In a second aspect of the present disclosure, there is provided another device for use in a wireless network. The device comprises at least one processor. The at least one processor is adapted to receive from an initiating device, and via the network, duration data, a downlink payload and a trigger. The duration data is for determining a duration of a time interval. The downlink payload comprises an aggregated MAC layer data unit, the downlink payload being received on first subcarriers. Based on the received trigger and duration data, the at least one processor is adapted to instruct transmission, on the network, of an uplink payload within time interval, and during at least part of the reception of the downlink payload, on second subcarriers that are at different frequencies to the first subcarriers. Thus, the downlink payload comprises the aggregated MAC layer data unit and the uplink payload may be transmitted in FDD communication.

In some embodiments the transmission of the uplink payload finishes no later than the transmission of the downlink payload. This ensures that there is no wasted time in which the uplink transmission continues to occupy the medium while the medium is no longer occupied by the uplink transmission.

In some embodiments, the uplink payload is triggered to be transmitted during a downlink frame that includes the trigger and the downlink payload. This has an advantage of being able to reduce preamble overhead compared with transmitting the trigger and downlink payload in separate frames.

In some embodiments, the at least one processor is adapted to commence an uplink transmission including the uplink payload, at a set time after receiving a frame field that includes the trigger.

In some embodiments, the at least one processor is adapted to commence an uplink transmission including the uplink payload, at a set time after receiving a first frame, the first frame including an aggregated MAC layer protocol data unit that includes the trigger. The set time may be a short inter frame spacing (SIFS).

In accordance with a third aspect of the present disclosure, there is provided a method for communicating between a device and at least one other device in a wireless network. The method comprises generating, at the device, duration data for determining a duration of a time interval, and instructing a transmission at the device. The transmission is of the duration data, a downlink payload and a trigger. The downlink payload comprises an aggregated MAC layer data unit, the downlink payload being transmitted on first subcarriers. The trigger configures the at least one other device to transmit an uplink payload within the time interval, and during at least part of the transmission of the downlink payload, on second subcarriers that are at different frequencies to the first subcarriers.

In accordance with a fourth aspect of the present disclosure, there is provided a method for communicating with an initiating device in a wireless network. The method comprises receiving, from the initiating device, duration data, a downlink payload and a trigger. The duration data is for determining a duration of a time interval. The downlink payload comprises an aggregated MAC layer data unit, the downlink payload being received within on first subcarriers. Based on the received trigger and duration data, the method further comprises instructing transmission of an uplink payload within the time interval, and during at least part of the reception of the downlink payload, on second subcarriers that are at different frequencies to the first subcarriers.

Each of the embodiments of the first aspect of the present disclosure may also be applied to the third embodiment of the present disclosure, and where possible, to the fourth aspect of the present disclosure.

Each of the embodiments of the second aspect of the present disclosure may also be applied to the fourth embodiment of the present disclosure, and where possible, to the third aspect of the present disclosure.

In accordance with a fifth aspect of the present disclosure, there is provided computer program with a program code for performing a method according to any of the methods of the present disclosure, when the computer program runs on a computer.

In accordance with a sixth aspect of the present disclosure, there is provided a non-transient computer readable medium storing program code for performing a method according to any of the methods of the present disclosure, when the program code runs on a computer.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

The present disclosure, in some embodiments thereof, relates to a device, method, and computer product for use in a wireless network, more specifically in some embodiments, a WLAN.

In general terms not intended to limit the scope of the disclosure, duration data is generated for determining a duration of a time interval. A transmission is then instructed to transmit the duration data and a downlink payload comprising an aggregated MAC layer data unit, the downlink payload being transmitted on first subcarriers. The transmission also includes a trigger that configures one or more other devices on the network to transmit an uplink payload within the time interval, and during at least part of the transmission of the downlink payload, on second subcarriers that are at different frequencies to the first subcarriers.

The transmission may be via a single frame or spread amongst multiple frames. In this manner, there is FDD of uplink and downlink payloads.

By using FDD to divide the bandwidth into multiple bi-directional transmit and receive sessions, preamble overhead may be shared between both uplink and downlink, hence enabling a better aggregated data rate for A-MPDUs of reasonable size. The UL transmission may have a lower probability of collision, as it can be protected through reservation of the medium by the downlink frame or by a preceding downlink frame containing the trigger. Splitting the channel between a number of downlink and uplink users may also allow an extension to payload transmission time for shorter A-MPDUs, thereby reducing network overhead and increasing the network utilization. Applications that require low latency uplink control channel may be triggered by the access point at predefined time intervals sharing time with downlink transmission to other STAs. Further, use of FDD may allow an increase of transmit power per frequency portion due to the transmission being carried out on a narrower bandwidth by multiple transmitters and hence improvement of signal to noise ratio.

Figure 1:
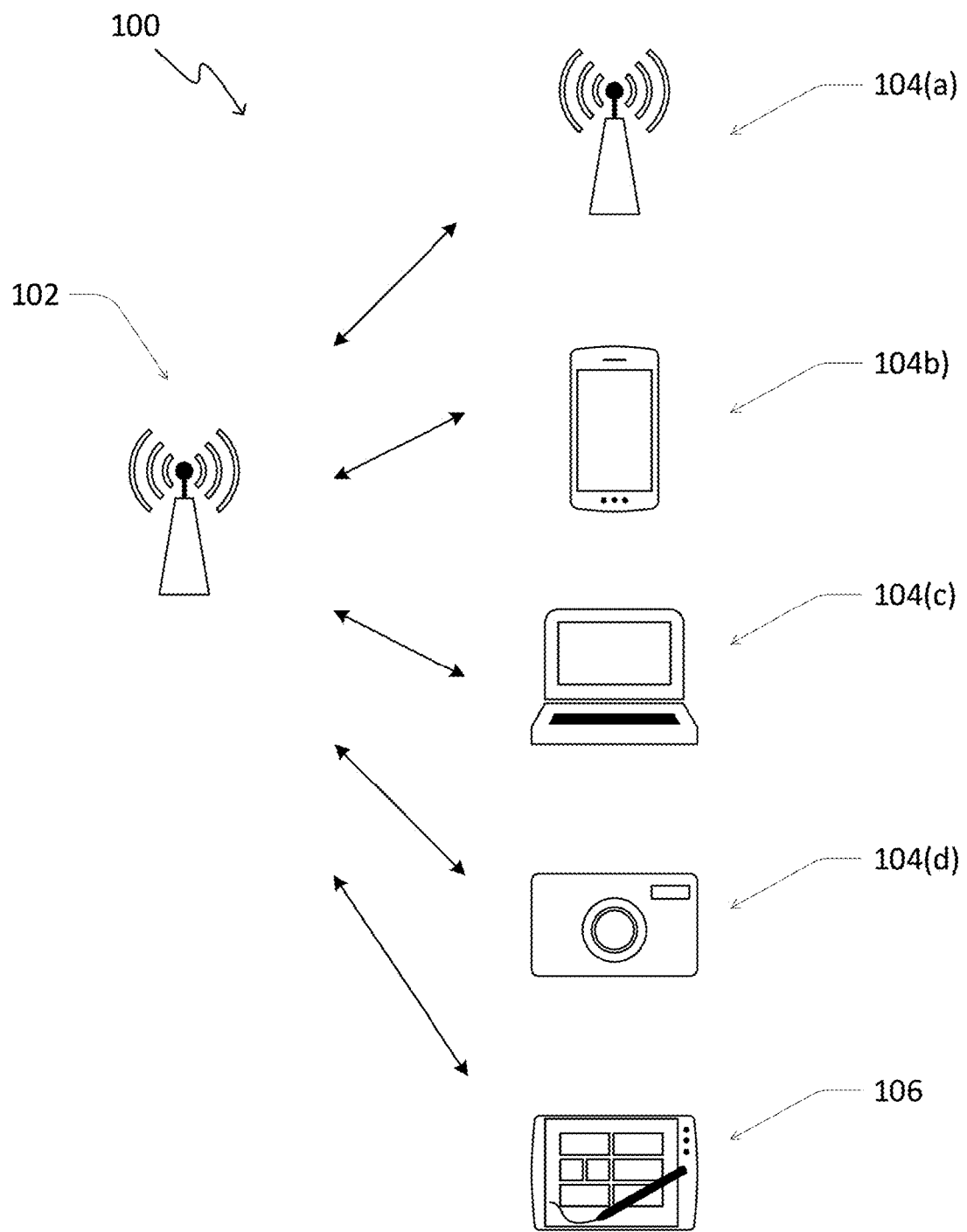
FIG. 1 is a conceptual diagram of a wireless network including a first device in accordance with an aspect of the present disclosure and a plurality of second devices that are in accordance with an aspect of the present disclosure.

Referring now to the drawings, FIG. 1 illustrates a network 100, which in the embodiments described herein is a WLAN, but in other embodiments is another form of a wireless network. The network 100 includes a plurality of a first computing node device 102, which wirelessly communicates with second computing node devices 104(*a-d*), 106 using a plurality of communication protocols. In this communication, each device 102, 104, 106 can both transmit and receive information. The computing node devices 102, 104, 106 may be any electronic device that includes hardware, and any associated software, for administering communication via the protocol(s). Thus for example, the computing node devices 102, 104, 106 may be user equipment, a mobile station, a fixed or mobile subscriber unit, a pager, a cellular telephone, a personal digital assistant, a smartphone, a laptop, a netbook, a personal computer, a tablet, a camera or consumer electronics, and the like. However, in the exemplary embodiment illustrated in FIG. 1, the first computing node device 102 is a device that includes or consists of a WLAN Access Point (AP), and for ease of explanation is generally referred to hereinafter as an AP. The second computing node devices 104(*a-d*), 106 act as clients to the Access Point, and are respectively a WLAN extender 104*a*, a smart phone 104*b*, a laptop 104*c*, a WLAN-enabled camera 104*d*, and a tablet 106.

The AP 102 operates according to a first protocol and/or one or more second protocols, depending on what protocol is required by the client devices 104, 106. In this example, client devices 104 are capable of communicating according to the first protocol and, in some embodiments, the second protocol(s), but the client device 106 is only capable of communicating according to the second protocol(s). In exemplary embodiments, the second protocol(s) comprises one or more of IEEE 802.11a, 802.11g, 802.11n, 802.11ac, and 802.11ax, i.e. one or more Wi-Fi protocols. Each of these protocols involve transmission of a WLAN legacy pre-amble that consists of Wi-Fi fields L-STF (legacy short training field), L-LTF (legacy long training field) and L-SIG (legacy signal field). The legacy preamble is used by all of the aforementioned IEEE 802.11 protocols for back-compatibility of newer protocols with older protocols, whereby a device that operates only the older protocol will not try to control the transmission medium while the frame of the newer, but back-compatible first protocol is being transmitted. Subsequent frames will also be protected provided they are transmitted within a relevant inter-frame spacing defined by the older protocol.

Figure 2:
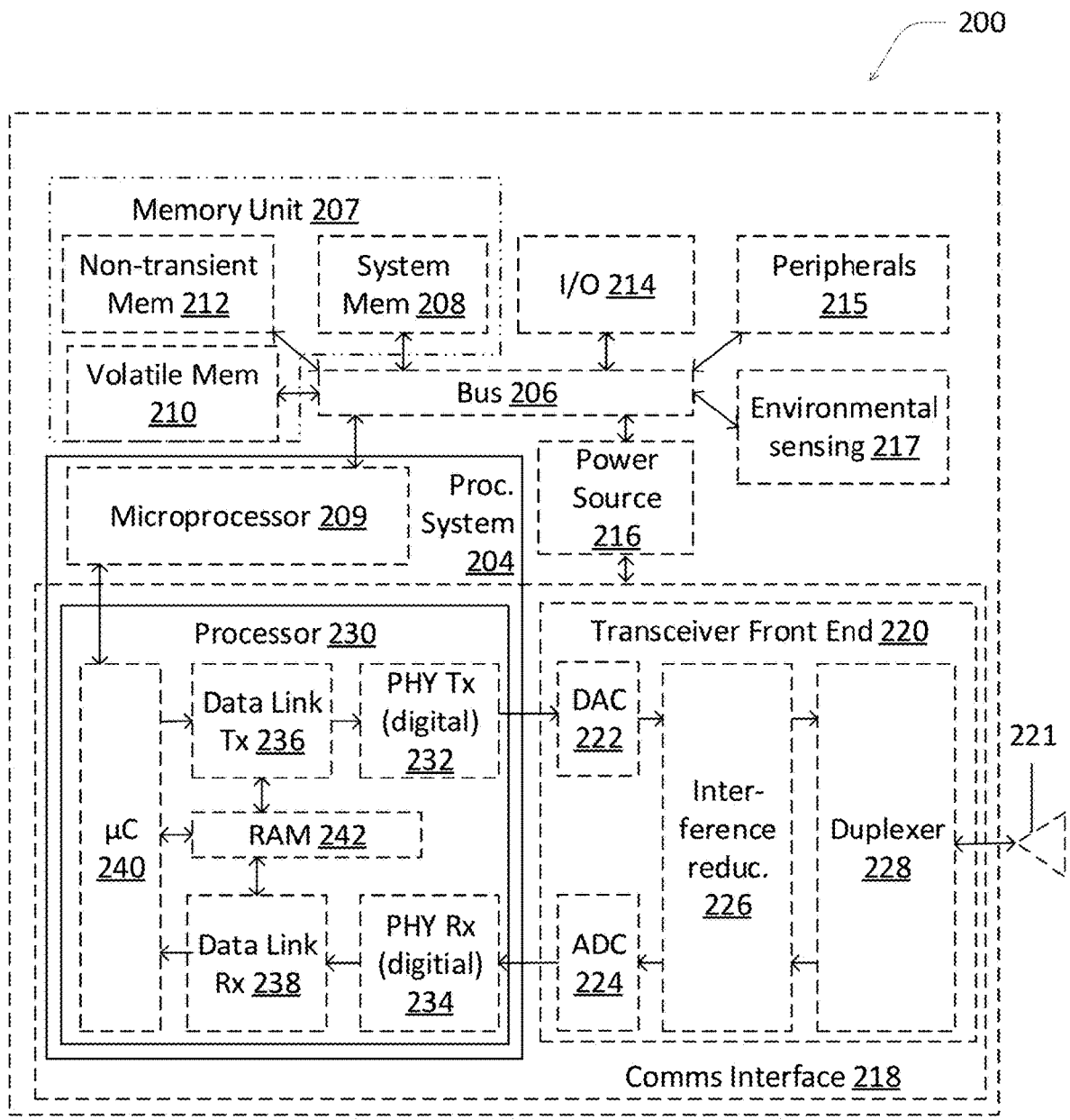
FIG. 2 is a conceptual block diagram that is depicting a device, or a part of a device, that is in accordance with an aspect of the present disclosure.

An exemplary architecture of a device 200 for performing an embodiment of one or more aspects of the present disclosure is illustrated in FIG. 2. The illustrated architecture of device 200 can be used for either or both of node devices 102, 104. The exemplary architecture is depicted as block diagram illustrating principal conceptual components of an exemplary device 200, and principal connections between those components, to aid a person skilled in the art in performing the disclosure. Components and connections that are not included in the illustration may therefore nonetheless be understood to be present by the person skilled in the art.

As has been discussed, the device 200 may include any necessary computer hardware that would be understood by the person skilled in the art to needed to perform the functions of the above listed or any other possible types of computing nodes. In the illustrated embodiment, the device 200 has a processing system 204 having one or more processors/execution devices. The processing system 204 communicates data with at least one computer readable storage medium in the form of memory 207, via a communication bus 209. The memory 207 has a system memory 208, a volatile memory 210 and a tangible, non-transient memory 212. The system memory may have a read only memory (ROM) that stores a basic input/output system (BIOS). The volatile memory may have a random access memory (RAM), such as dynamic random access memory (DRAM). The non-transient memory 212 may have a hard disk drive(s), a solid state drive(s), and/or a flash memory device(s) and the like, and may store an operating system (e.g. Microsoft Windows, Apple OSX, Unix, and Linux) and/or other program products for running for operating device 200. The computer readable storage medium for providing the non-transient memory 212 may be, for example, but is not limited to, an electronic storage device, a magnetic storage device, an optical storage device, an electromagnetic storage device, a semiconductor storage device, or any suitable combination of the foregoing.

The processing system 204 includes a microprocessor 206 that performs tasks by executing software in the form of instructions and data stored on, and read from, the system, volatile, and/or non-transitory memory 208, 210, and 212. The tasks performed by the microprocessor can be some or all of the tasks that form various aspects of the present disclosure. The instructions are, at least upon powering up the device 200, stored in the non-transient memory 212 or an external data storage device accessed by the computer processing system 202 via an I/O interface 214. In some embodiments, the software may be provided to computer processing system 202 via a wired or wireless communication over a communications interface 218, which provides a network interface. Thus as will be appreciated, computer readable program instructions described herein may be downloaded to respective computing/processing devices from a computer readable storage medium or to an external computer or external storage device via a network, for example, a wireless local area network (e.g. Wi-Fi), a wide area network (e.g. the Internet), and/or a cellular network, e.g. Long-Term Evolution (LTE). The communications interface 218 may have additional communications connections, including but not limited to, Bluetooth, ZigBee, and 3G etc. Each of the communications connections may be via a transceiver front end 220 that drives antenna module which may be a single antenna, or a series of antennas for providing beamforming.

The transceiver front end 220 includes analog components and mixed analog and digital signal components. The mixed analog and signal components include a digital to analog converter (DAC) 222 that generates RF signals from one or more instructions from the processing system 204. In some embodiments, the one or more instructions include one or more binary data streams to be converted to an analog signal by the DAC 222. The microcontroller 240 may, in some embodiments (not shown), also include one or more control signals to further instruct the transceiver front end 220, e.g. to be control the DAC, the duplexer 228 or an amplifier module (not shown). For example the FDD support of duplexer 228 may be switched off when FDD is not in operation.

The mixed analog and signal components include an analog to digital converter (ADC) 224 for converting received RF signals to digital form which are then processed by the processing system 204. The processing of the analog signal components are handled by an RF front end that includes an interference reduction module 226 that acts to minimize interference between the outbound signal from the DAC and the inbound signal to the ADC and a duplexer 228 for simultaneously sending and receiving signals to the antenna module 221 to support FDD on an antenna module 221 that is commonly employed for both transmitting and receiving RF signals. In other embodiments there is no duplexer 228 and FDD is supported by having different antenna modules can be used for transmitting and receiving signals.

Processing system 204 also includes a processor 230 that may be adapted to perform an embodiment of one or more aspects of the present disclosure. For example, the in some embodiments the processor 230 is adapted to perform a method of the present disclosure, for example by executing one or more tasks. In some embodiments, the tasks are provided in instructions stored in the non-transient memory 212. Thus, in some embodiments, the processor 230 may comprise electronic circuitry including, for example, programmable logic circuitry, field-programmable gate arrays (FPGA), or programmable logic arrays (PLA) that execute a computer readable program instructions by utilizing state information of the computer readable program instructions to personalize the electronic circuitry, in order to perform one or more aspects of the present disclosure.

The processor 230 generates digital instructions that it forwards to the transceiver front end, and it receives the digital signal generated received by the transceiver front end 220. It is therefore convenient to herein refer to the processor 230 to as a transceiver back-end. In the context of the Open Systems Interconnection (OSI) of a telecommunication system, the processor operates digital aspects of the physical layer (PHY) of the OSI model, via digital PHY transmit module 232 and PHY receive module 234, operates the data link layer via data link transmit module 236 and data link receive module 238. In any case, in some embodiments the microcontroller 240 communicates with microprocessor 206 via a communications interface, such as SPI, SDIO, I²C, UART or GPIO. In some embodiments, at least a portion of the data link layer functions are performed by a microcontroller 240.

The processor 230 can include a RAM to enable data storage by the microcontroller 240, the transmit link modules 236, and the receive data link modules 238. Non-transient memory can also be included in the microcontroller 240 to configure the microcontroller's operation. In other embodiments the processor 230 adapted to perform an aspect of the present disclosure is an application-specific integrated circuit (ASIC) chip.

In other embodiments some or all of the functions of processor 230 may be integrated into microprocessor 206. It will therefore be appreciated by a person skilled in the art that the processor 230 may be a processing component of a larger processing chip/integrated circuit, or may be a stand-alone processing chip. Further, as will be appreciated by a person skilled in the art that the processor 230 may alternatively be distributed amongst multiple chips.

Figure 3:
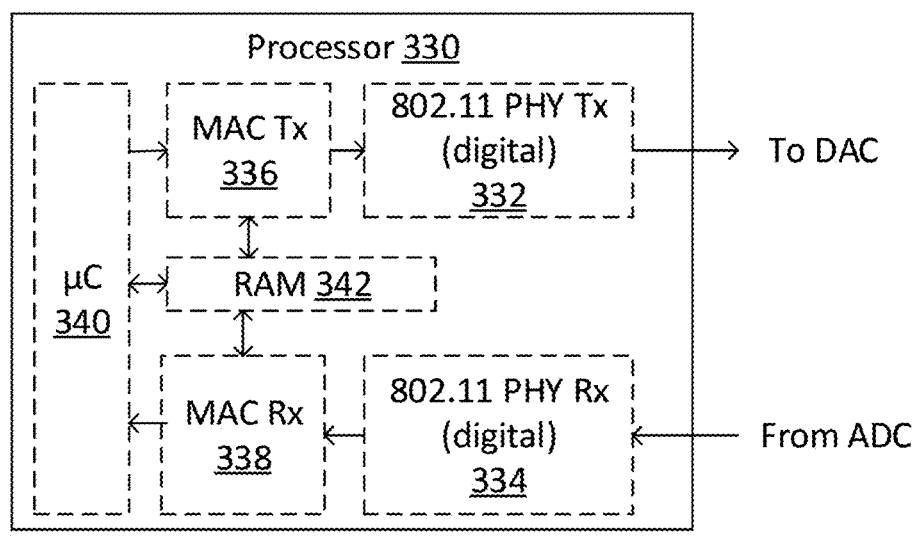
FIG. 3 is a conceptual block diagram of a chip that is in accordance with an embodiment of the device.

FIG. 3 illustrates an exemplary embodiment of a processor 330, which is an exemplary embodiment of processor 230 in which the processor 230 is adapted as the back-end (i.e. digital end) of a WLAN transceiver. Features 232, 234, 236, 238, 240, 242 of processor 230 respectively correspond to features 332, 334, 336, 338, 340, 342, of processor 330. However, processor 330 more specifically has a MAC transmit module 336 and MAC receive module 338 in place of the data link layer transmit and receive modules, respectively. A logical link control sublayer of the data link layer is included in microcontroller 330. The digital components of the PHY layer are provided by IEEE 802.11 compliant transmit and receive components 332 and 334, respectively.

In some embodiments, the MAC transmit module 336 generates a MAC layer protocol data unit (MDPU) that includes an aggregated MAC layer data unit in the form of aggregated MAC service data unit (A-MSDU), the A-MSDU having been received from the logical link control sublayer, which generated it. The MAC transmit module forwards the MPDU to the PHY transmit component 332.

In other embodiments, the MAC transmit module 336 generates an aggregated MAC layer data unit in the form of an A-MPDU, which the MAC transmit module 336 then forwards to the digital PHY transmit component 332. Optionally, the A-MPDU can include one or more A-MSDUs.

In either case, an aggregated MAC layer data unit (A-MPDU or A-MSDU) is provided to the digital PHY transmit component 332. For exemplary embodiments illustrated hereinafter the PHY transmit component may be any OFDM based PHY component, and thus may be an IEEE 802.11 PHY component, such a PHY component of 802.11a, 802.11g, 802.11n, 802.11ac, 802.11ax or future 802.11 technologies. However, in some embodiments, the PHY component is more specifically an 802.11ax PHY component.

The digital PHY transmit component 332 receives a relevant data unit from the MAC transmit module 336, the received data unit being a PHY service data unit (PSDU). From the PSDU, the digital PHY transmit component 332 generates a PHY protocol data unit (PPDU) that includes a data component generated by a PHY data generator and a header generated by a PHY preamble generator. The PHY data generator modulates and encodes the PSDU, e.g. using BPSK QPSK, 16-QAM, 64-QAM, 256-QAM or 1024-QAM, as in 802.11ax. Other aspects of the applied modulating and coding scheme can also be in accordance with 802.11ax.

The modulation and coding scheme is applied to each of a plurality of OFDM subcarriers having a defined bandwidth and being spread at difference frequencies that collectively span a total bandwidth of the PHY layer. The bandwidth of the PHY layer is selected from any one of 20 MHz, 40 MHz, 80 MHz and 160 MHz, consistent with 802.11ax.

The total number of OFDM tones/subcarriers is selected to be a set of 26, 52, 106, 242, 484 or 996 OFDM tones/subcarriers, consistent with 802.11ax. In some embodiments, each subcarrier has a bandwidth of 78.125 kHz. In some embodiments, all of the first sub carriers (i.e. the downlink resource unit(s)) can be used to transmit to a single one of the client devices 104. In other embodiments all of the first subcarriers can be used to transmit to each of a selected plurality of the client devices 104, i.e. by multicast transmission. In yet other embodiments all of the first subcarriers can be used to transmit to each of the client devices 104, by broadcast transmission.

However, in yet other embodiments of the present disclosure, the use of the first subcarriers is distributed between the pluralities of the client devices, whereby different client devices receive information on a different, non-overlapping subset of the first subcarriers. Thus the transmission is capable of a Frequency Divisional Multiple Access (FDMA) scheme. In embodiments described herein, the FDMA is achieved by Orthogonal Frequency Duplex Multiplex Access (OFDMA), in which multiple carriers are included in each RU. Further OFDM tones are used for both uplink and downlink transmissions. The use OFDM tones in this manner can be advantageous in multipath environment and is consistent with Wi-Fi.

The aggregated MAC layer data unit may be an A-MSDU or A-MPDU (including, but not limited to, A-MPDUs that incorporate an A-MSDU), but in exemplary embodiments described hereinafter is an A-MPDU.

The PHY data generator receives at least one, and in some embodiments plurality of, aggregated MAC layer data units to be transmitted within a given time interval. The PHY data generator modulates received aggregated MAC layer data units to respective subsets of a first set of subcarriers for transmission. The first set of subcarriers is itself a subset of the total set of OFDM subcarriers. Each of the respective subsets of first subcarriers acts as a resource unit (RU) for conveying a PPDU. Each RU consists of one or more subcarriers, but in some embodiments each RU has at least 26 subcarriers.

The PHY data generator converts the coded and translated aggregated MAC layer data unit to the time domain by calculating an inverse Fast Fourier Transform (IFFT). The calculated signal is forwarded as a payload, with a PHY preamble, to the transceiver front end 220, which converts it to an analog signal and drives transmission of the analog signal, as a frame, from antenna 221.

The PHY preamble is generated by the PHY preamble generator. In some embodiments, the preamble (PA) of the payload is fronted by a legacy WLAN preamble, e.g. a Wi-Fi legacy preamble consisting of L-STF, L-LTF and L-SIG, with the L-SIG field defining a transmission time (duration) of the frame. Additionally preamble fields specific to the first, newer protocol are also generated by the PHY preamble generator. An example of such a preamble, which is be used for some embodiments of the present disclosure is a High Efficiency (HE) WLAN preamble, being a preamble in accordance with 802.11ax. The HE preamble has a high efficiency (non-legacy) portion including a HE-SIG-A field; a HE-SIG-B field(s); a high efficiency short training field (HE-STF); and a high efficiency long training field (HE-LTF). At least the L-SIG, HE-SIG-A and the HE-SIG-B fields undergo an IFFT and before being forwarded to the transceiver front end 220.

Upon receiving a frame from another device, on antenna 221, the transceiver front end 220 filters the signal, performs interference reduction via module 226 and converts the signal to digital form via ADC 224 for processing by processor 230. In the more specific example of processor 230 being processor 330, the 802.11 digital PHY receiving component 334 performs an FFT, demodulates and decodes the received data, and performs forward error correction, before finally forwarding the data to the MAC receiving module 338 for higher level processing. The digital PHY receiving component 334 is compliant with the same protocol(s) for which the digital PHY receiving component 334 is compliant. In an event that the received data includes a trigger to transmit a signal, the microcontroller 340 identifies based on the trigger and received duration data, parameters for transmitting the signal, the parameters including the size of the payload to transmit and when to commence transmission of the frame containing the payload. The signal received by the device 200 has its payload on a second set of subcarriers that is a subset of the total set of subcarriers, the second set of subcarriers being different to the first set of subcarriers. Further, in some embodiments, the second set of subcarriers collectively span a frequency range that is non-overlapping with a frequency range encompassing the first set of subcarriers, and the two frequency ranges are separated by a guard band having a bandwidth that is greater than a bandwidth of one of the subcarriers. The guard band is included to reduce interference between the transmitted and received signals.

In some embodiments the device 200 is an access point 102 whereby its transmitted signal is a downlink signal and its received signal is an uplink signal.

As has been discussed, the client device 104 may have the same architecture as the access point 102. However control over which subcarriers the client device transmits on is dynamically allocated by the trigger received from the access point 102.

In addition to the functions described above, the device 200 may have a variety of other hardware elements. For example, in some embodiments it may be any network-enabled computing device (e.g. a laptop, router etc., as has been described). For example I/O interface 214 may include one or more of a speaker, microphone, keypad, display/touchscreen etc., which may be integrally incorporated into the device. Additionally the device may include a peripherals interface 215 to connect with one or more ancillary devices such as a mouse, keyboard, monitor, scanner, projector, digital camera etc. An environmental sensing system 217 may also be included to provide for example, temperature sensing, or a global positioning system or to measure any other condition of the device's environment. The device may also include an internal power source 219, such as a battery, which may be a rechargeable battery.

Frequency Division Duplexing

Figure 4:
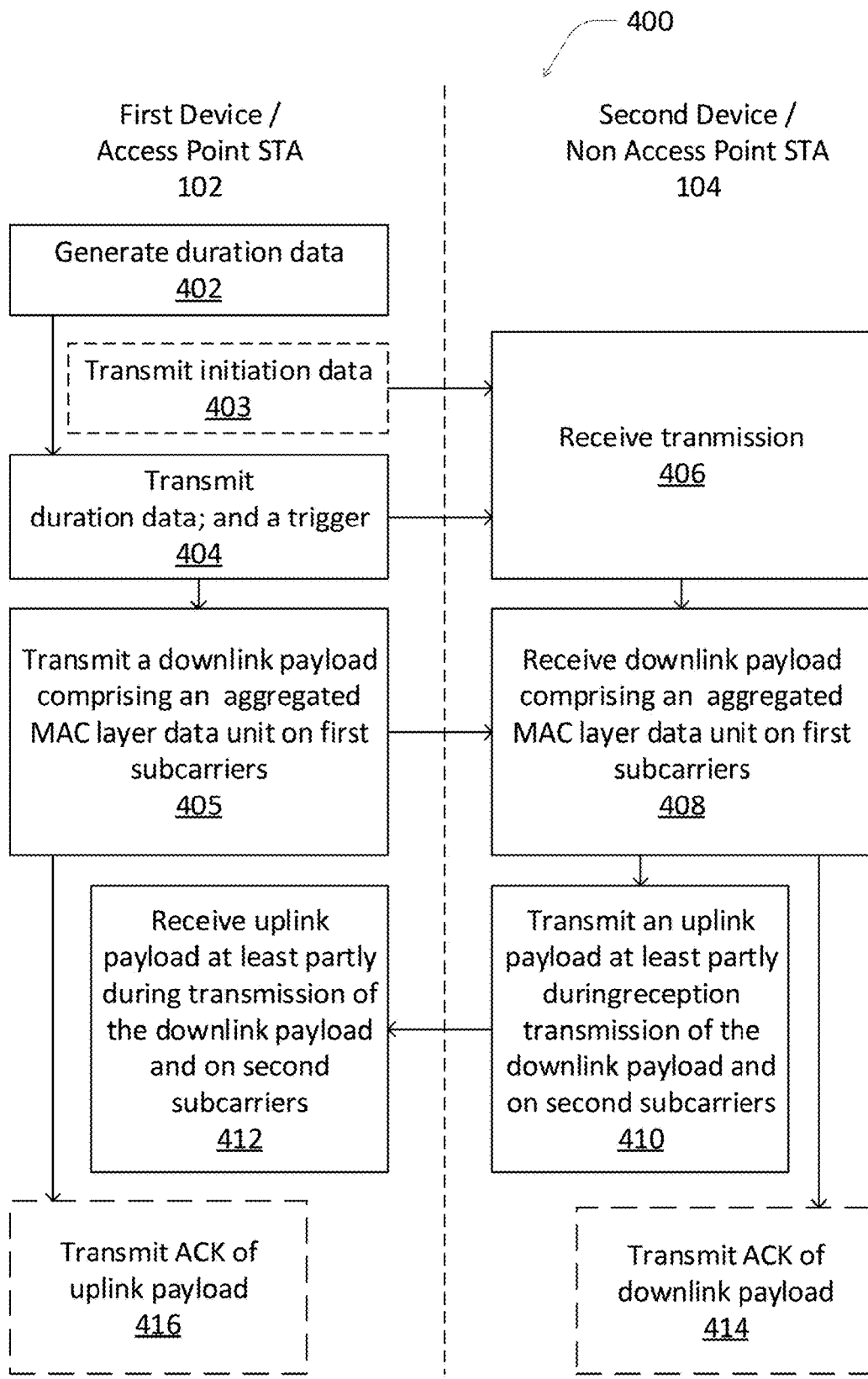
FIG. 4 is a flow chart showing a method in accordance with one or more aspects of the present disclosure.

A top level flow diagram depicting an exemplary method 400 according to one or more aspects of the disclosure is illustrated in FIG. 4, such as a method in accordance with the aforementioned first protocol, in which the AP 102 and client devices 104 are capable of communicating with each other.

The first protocol provides frequency division duplex communication between the AP 102 and each of the client devices 104, whereby information is transmitted using first subcarriers and information is received on second subcarriers, different to the first subcarriers. In embodiments described herein, the transmission by the AP 102 is a downlink transmission to one or more clients 104, and reception by the AP 102 is of reception of an uplink transmission from one or more uplink clients 104.

At step 402, processor 230 of the AP 102 generates duration data for determining a duration of a time interval for an uplink transmission. In some embodiments, the duration data is, or is correlated with, a first indicator that identifies a duration of a first downlink frame, wherein that duration is used to derive the time interval for an uplink frame. However, in some embodiments, the AP also transmits a second duration indicator that identifies a duration to be reserved after the first downlink frame for one or more further frames to be communicated between the AP 120 and the client devices 104. In some embodiments, the duration of the time interval for the uplink could be calculated from the second duration indicator. However, in any case, in some embodiments, the duration data transmitted to the client device 104 directly defines the time interval.

A device 104 that receives the second duration indicator, but which is not being addressed by device 102, sets a Network Allocation Vector (NAV) to match the second duration indicator, and counts down the NAV. When NAV reaches zero, the device 104 determines that protected transmission opportunity period (TxOP) initiated by the device 102 has finished, and the device 104 may then attempt to control the medium.

In some embodiments, the processor 230 instructs transceiver front end 220, a step 403, to transmit initiation data in a frame, the frame including the trigger and the WLAN legacy preamble. The transmission initiation data comprises the L-STF and L-LTF components of the WLAN legacy preamble. Upon receiving the transmission initiation data, a client device 104 recognizes that a WLAN frame is being transmitted, and synchronizes to the WLAN frame. The WLAN legacy preamble is transmitted across a bandwidth covering a frequency range that includes all subcarriers. This indicates to each client device 104, 106 not to attempt to control the medium, in that bandwidth, for at least the duration of the frame, plus a predefined inter-frame spacing (in the event of any further frames) in accordance with the communication protocol.

At step 404 the processor 230 instructs front transceiver front end 220 to transmit the duration data and a trigger and, at step 405, to transmit a downlink payload consisting of an aggregated MAC layer data unit. The downlink payload is transmitted on first subcarriers. In some embodiments, the processor 230 separately instructs the front end transceiver 220, via steps 403, 404 and 405, to perform respective transmissions. However, in other embodiments one, two or all three of instruction steps 403, 404 and 405 form a single instruction step.

In some embodiments, at least part of duration data that is used to control an uplink transmission is included as a frame duration field of the L-SIG field of the legacy preamble, the frame duration field being provided as a length of the frame (in bits) and rate factor (6 Mbits/s), whereby the duration of the frame is the length divided by the rate factor. The duration field of the L-SIG may thus be used as the aforementioned first duration indicator. In embodiments in which duration data includes a duration indicator for identifying a duration to be reserved after the first downlink frame, such a duration indicator may be provided by a TxOP duration field of a HE-SIGA field, as defined by 802.11ax.

In some embodiments, the downlink payload that is frequency division duplexed with an uplink frame is transmitted in the same downlink frame that contains the duration data and trigger. Such embodiments may include all of the fields of the HE-SIG-B field plus a direction field, such as a single bit field, define that the HE-SIG-B field is to be interpreted by a client device as a trigger for an uplink transmission. For RUs used for a downlink payload, a first value for the direction field is used to indicate that the HE-SIG-B field is to be interpreted by the client device as being signal information corresponding to a downlink payload, which is consistent with the use of HE-SIG-B in 802.11ax. However, a different, second value for that the direction field is used to indicate that the HE-SIG-B field is to be interpreted by the client device as being signal information corresponding to an uplink payload. In some embodiments direction fields are respectively included for each of the stations defined in the HE-SIG-B, as is explained elsewhere herein.

In other embodiments, a first downlink frame includes the trigger and duration data, and a second downlink frame includes the downlink payload that is frequency division duplexed with an uplink frame. In such embodiments, the first downlink frame can comprise of a legacy preamble, a further preamble such as non-legacy portion of a HE preamble, and one or more MPDUs, including a trigger MPDU. The trigger MPDU can be a MAC-layer "trigger frame" as defined in 802.11ax. The term "trigger MPDU" is generally herein used in place of "trigger frame" because the term "frame" is used herein only in the context of PPDU frames. However, in some embodiments the PPDU has a payload that is only a single MPDU, being the trigger MPDU, and in such cases the PPDU is referred to herein as a trigger frame.

In embodiments involving a trigger MPDU, only a portion of the available RUs are allocated for triggering uplink transmission by having the MAC transmit module 336 enter the necessary values in the trigger MPDU to engage those RUs for uplink. The rest of the RUs remain unallocated in the trigger MPDU. After the first downlink frame is transmitted, the second downlink frame is transmitted on one or more of those unallocated RUs. Thus a downlink frame is transmitted in one frequency band, while an uplink frame is simultaneously received in a different frequency band. In some embodiments, only a portion of RUs not allocated in the trigger MDPU are used for the downlink frame, with one or more RUs between the downlink and uplink RUs remaining unused to provide a guard channel between the downlink and the uplink RUs. In some embodiments, the trigger MPDU is a first MPDU in an A-MPDU that is included in the first downlink frame. The rest of the A-MPDU includes other payload data to the client device(s) 104. In embodiments involving a trigger MPDU, the trigger MPDU includes the trigger and the duration data upon which the client device(s) determine a time interval to transmit the uplink payload in an uplink frame.

At step 406, the corresponding processor 230 of a client device 104, e.g. client device 104b, receives the transmitted duration data and trigger at step 406 and the downlink payload on the first subcarriers at step 408. At step 410, based on the trigger and duration data, the client device 104b instructs transmission of an uplink payload within the time interval, and during the reception of the downlink payload, on second subcarriers that are at different frequencies to the first subcarriers. The uplink payload is transmitted to the AP 102 on one or more of the second subcarriers allocated by the AP 102 as an RU to be used for uplink transmission by client device 104b. Each one of the client devices 104a, 104c and 104d (up to a predefined number of client devices) likewise receives a trigger and duration data intended for that client device, and transmits an uplink payload, based on the trigger and duration data it receives. For such cases, the duration data is the same for all client devices 104, but the trigger varies for different client devices so that each client device transmits its corresponding uplink payload on a different RU. In any case, all subcarriers for the uplink payload are selected, by the AP 102, from the second set of subcarriers.

The uplink frame transmission from each participating client device 104 to the AP 102 on the second subcarriers delivers a corresponding uplink payload consisting of an aggregated MAC layer data unit, which is an A-MPDU or an A-MSDU, but in exemplary embodiments described herein is an A-MPDU.

At step 412, the AP 102 receives each triggered uplink payload from the various participating client devices 104 at least partly during the transmission of the downlink payload.

In some embodiments, the uplink payload(s) are received concurrently with the transmission of the downlink payload, whereby the period in which the/each uplink payload is received is substantially the same, or the same within the margin of a cyclic prefix, as a period in which the downlink payload is transmitted. In some embodiments, the uplink frames that carry the respective uplink payload(s) are received concurrently with the transmission of the downlink frame that carries the downlink payload, whereby the period in which the/each uplink frame is received is substantially the same, or the same within the margin of a cyclic prefix, as a period in which the downlink frame is transmitted.

In some embodiments of the present disclosure, an acknowledgement procedure follows the transmission of the downlink and uplink frames. Each client device 104 that receives the downlink frame performs error checking on the downlink payload and if the payload has the error checking passed, transmits an ACK frame at step 414, in respect of the downlink frame. The ACK frame spans the same bandwidth as the frequency band occupied by the first subcarriers. The transmission of the ACK frame occurs a short inter frame spacing (SIFS), e.g. 16 µs, after completing transmitting the uplink payload at step 410. Simultaneously, the AP 102 performs error checking on the received uplink frame and if the error checking is passed, transmits an ACK frame at step 416, in respect of the uplink frame. That ACK frame spans the same bandwidth as the frequency band occupied by the second subcarriers. The error checking of the respective error frame may be performed using any standard error checking procedure, such as a frame check sequence (FCS). Thus, simultaneously (within the cyclic prefix) with the transmissions of the respective ACK frames, each client device 104 expects to receive the relevant ACK frame. In an event of successful uplink and downlink payload transmissions, each client device receives the relevant ACK of the uplink frame and the AP 102 receives an ACK from each of the relevant client devices 104. As will be appreciated, the ACK frame transmitted by the AP 102 is frequency division duplexed with the ACK frames transmitted by the client device(s) 104. To allow for a plurality of frames to be transmitted in a single direction, each ACK frame is more specifically a block acknowledge (BA) frame.

Controlling the Uplink Payload

Each client device 104 that transmits an uplink transmission is configured to do so by uplink configuration data transmitted to the client device 104 by the AP 102. For exemplary embodiments described herein the uplink configuration data is transmitted on the second sub carriers.

The uplink configuration data comprises:
  duration data for determining, by the client device 104, a duration of a time interval in which the uplink frame transmission is to occur; and
  a trigger.

The duration data may be defined in any way from which duration is directly or indirectly identifiable. Thus, the duration data can be a unit of time; or a measurement of an amount of data in conjunction with rate of transmitting the data (e.g. number of bits and bit rate; or number of symbols, the number of bits per symbol and symbol rate; or the like) which can be included with measurement of the amount of data or may be already known by the AP 102 and client 104. Similarly, it is to be understood that when the client device determines the duration of the time interval for sending the uplink transmission it can to do by determining an amount data (with a known rate factor), as opposed to a measurement of time.

In some embodiments, the duration for the uplink frame is explicitly stated in the duration data, as an amount of time or as a length (e.g. number of bits). Optionally a corresponding rate factor for the length is also stated.

In other embodiments, the duration of the time interval for uplink transmission is calculated by the client device 104 from its duration data. For example, in one some embodiments, duration data is included in the legacy preamble of a downlink frame (e.g. as a duration of the downlink frame, indicated in L-SIG). The client device determines the duration of the time interval depending on the duration of the downlink frame, e.g. the duration may be some defined proportion of the duration of downlink frame.

The trigger selects one or more client devices to transmit an uplink payload within the time interval corresponding to the duration data, and at least partly, and in some embodiments entirely, during the transmission of the downlink payload that contains the aggregated MAC layer data unit, on the second subcarriers. The MAC receiving module 338 of each client device that receives the trigger identifies whether that client device is an intended recipient of the trigger. If it is, the microcontroller 340 commands the MAC transmitting unit 336 to generate an MDPU or A-MPDU and pass it to the PHY transmit module 332 to drive uplink transmission of the MPDU/A-MPDU in the time interval corresponding to the received duration data.

In embodiments described hereinafter, the uplink payload transmitted by the client device is entirely within a period in which the downlink payload is being transmitted. In some embodiments, additionally or alternatively, an uplink frame carrying the uplink payload is transmitted entirely within (i.e. not starting before or finishing after) a period in which a downlink frame carrying the downlink payload is transmitted. Thus in such embodiments, access point receives the entirety of the uplink payload no later than it finishes transmitting the downlink payload.

In some embodiments, the trigger includes:
an AP Identification field, such as a MAC address of the AP device, so the client device can identify the destination address for the uplink frame; and
a client station (STA) information field to identify to any receiving client devices 104 which of the client devices 104 are to transmit an uplink frame; and
a trigger indication indicator so that the client device recognizes the trigger.

The trigger may also include details of how the identified client station is to perform the uplink transmission.

In some embodiments, the client station information field is a per station (STA) information fields for respective STAs of n STAs with which the AP is capable of communicating, each per STA information field including STA Identification, such as a MAC address, for uniquely identifying the relevant client device 104.

Each of the per station information fields can also include the details of how the identified client station is to perform the uplink transmission, so different details can be provided to different client devices. However, optionally a common information field is included, defining some of these details and/or any other details that are commonly utilized by all of the client devices.

In some embodiments, transmission details in each of the per station information field include one or both of the following PHY level parameters:
a modulation and coding scheme (MCS) field for identifying which modulation and coding scheme is to be used for the uplink transmission; and
a resource unit allocation field defining which of the second subcarrier(s) are allocated to the identified STA for the uplink transmission.

Other PHY level information can also be included, such as:
a bandwidth field defining a bandwidth of each of the second subcarriers; and
a transmission power field defining the required power of the uplink transmission.

The trigger can also include frame check sequence (FCS) data.

The trigger indication indicator can be included in a frame control field of trigger.

In some embodiment, the trigger and the duration data are included in a MAC-layer trigger frame, i.e. a trigger MPDU, such as "trigger frame 500" as referred to in U.S. patent application publication 2016/0165589 A1 (US'589), published 9 Jun. 2016, and titled "Trigger Frame Format For Orthogonal Frequency Division Multiple Access (OFDMA) communication", or such as defined in IEEE standard Draft P802.11ax-D2.0, October 2017, which for the purpose of the present disclosure is assumed to be 802.11ax. The entire contents of each of US'589 and 802.11ax are incorporated herein by reference. A "duration" field in the MAC trigger frame as described in 802.11 and US'589 is included between the frame control field and receiver address field that defines, by MAC address, which device is intended to receive and decode to the MPDU. In some embodiments, that duration field defines the duration data used in the present disclosure.

Figure 5A:
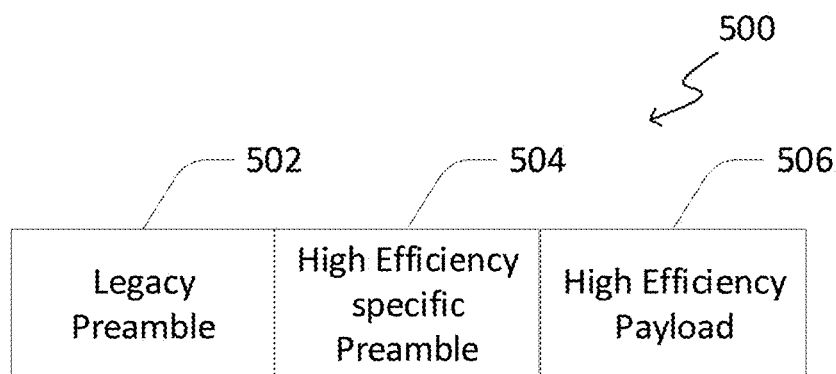
FIG. 5A is a diagram depicting a format of a frame transmitted in accordance with an aspect of the present disclosure.

An exemplary frame format of a downlink PPDU frame 500 transmitted in embodiments of the present disclosure is illustrated in FIG. 5A. The frame 500 includes a preamble consisting of a legacy WLAN preamble, and a preamble that is specific to the first protocol, which in some embodiments is a high efficiency portion 504 of HE preamble, as defined in Draft P802.11ax-D2.0, October 2017 or as defined in US'589. A payload 506 is also included. The payload 506 is a data presented in accordance the legacy preamble 502 and the preamble specific to the first protocol, i.e. high efficiency preamble 504. The payload can be, or include, an aggregated MAC layer data unit. For example, in some embodiments the payload includes the aforementioned trigger MPDU, which in some cases is included in an aggregated MPDU.

Figure 5B:
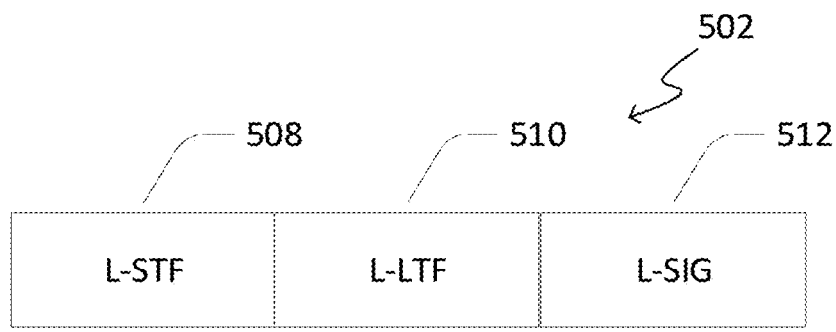
FIG. 5B is a diagram depicting a legacy part of a preamble that is included in the frame format.
Figure 5C:
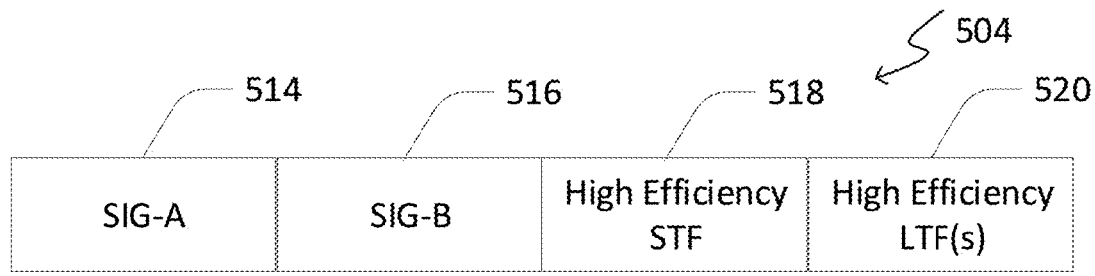
FIG. 5C is a diagram depicting a protocol-specific part of the preamble.
Figure 5D:
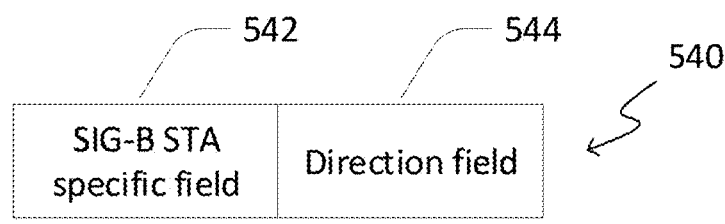
FIG. 5D is diagram depicting a modification to a part of the protocol-specific preamble, in accordance with an embodiment of the present disclosure.

The legacy preamble 502 is illustrated in more detail in FIG. 5B, showing that the legacy preamble 502 consists of an L-STF field 508, an L-LTF field 510 and an L-SIG field 512, as has been discussed herein. The protocol-specific preamble 504 is illustrated in more detail in FIG. 5C. It includes an HE-SIG-A field 514, an HE-SIG-B field 516, a protocol specific short training field 518, and a protocol specific long training field(s) 520, each of these fields being consistent with high efficiency WLAN, as described.

HE-SIG-A includes a TxOP field for defining the TxOP. When a client device 104 prepares an uplink frame it calculates how much time will be remaining in the TxOP. The time remaining in TxOP will be the received TxOP value minus SIFS minus the duration of the uplink frame. The calculated time remaining in TxOP is then included in the uplink frame. The HE-SIG-A 514 field also, inter alia, defines modulation and coding features of the HE-SIG-B field. The HE-SIG-B field includes a common information field can be used by all of client devices 104. The HE-SIG-B also field includes, inter alia, MCS information which may be used by the relevant client device to decode a payload 506. Such MCS information is provided on a per STA basis, whereby n STA specific fields are provided to define MCS information specific to n respective client devices. Each station specific field also includes a MAC address field to address a specific client device 104.

In some embodiments, rather than using a trigger MPDU to trigger an uplink transmission, a modified version of the HE preamble is be used whereby an FDD STA specific field 540 is used in place of each of the ordinary HE station specific fields. The FDD STA specific field includes a station specific field 542, which in some embodiments is the HE-SIG-B station specific field, and also includes a direction field 544. The direction field 544 indicates whether the station specific field is defining information for a downlink payload, e.g. payload 506, or should instead be used by the client device defined in the station specific field to transmit an uplink payload. Optionally, in such an embodiment all fields included in the trigger MPDU could be included in the station specific field 544.

As can be appreciated from the above format, at least part of the trigger may be transmitted between transmitting different parts of the duration data. Similarly, at least part of the duration data may be transmitted between transmitting different parts of the trigger.

Based on the trigger and the duration data, the client device(s) transmits an uplink frame having the uplink payload during a time interval in which the AP transmits a downlink frame having a downlink aggregated MAC layer data unit.

Exemplary FDD Transmissions

Figure 6:
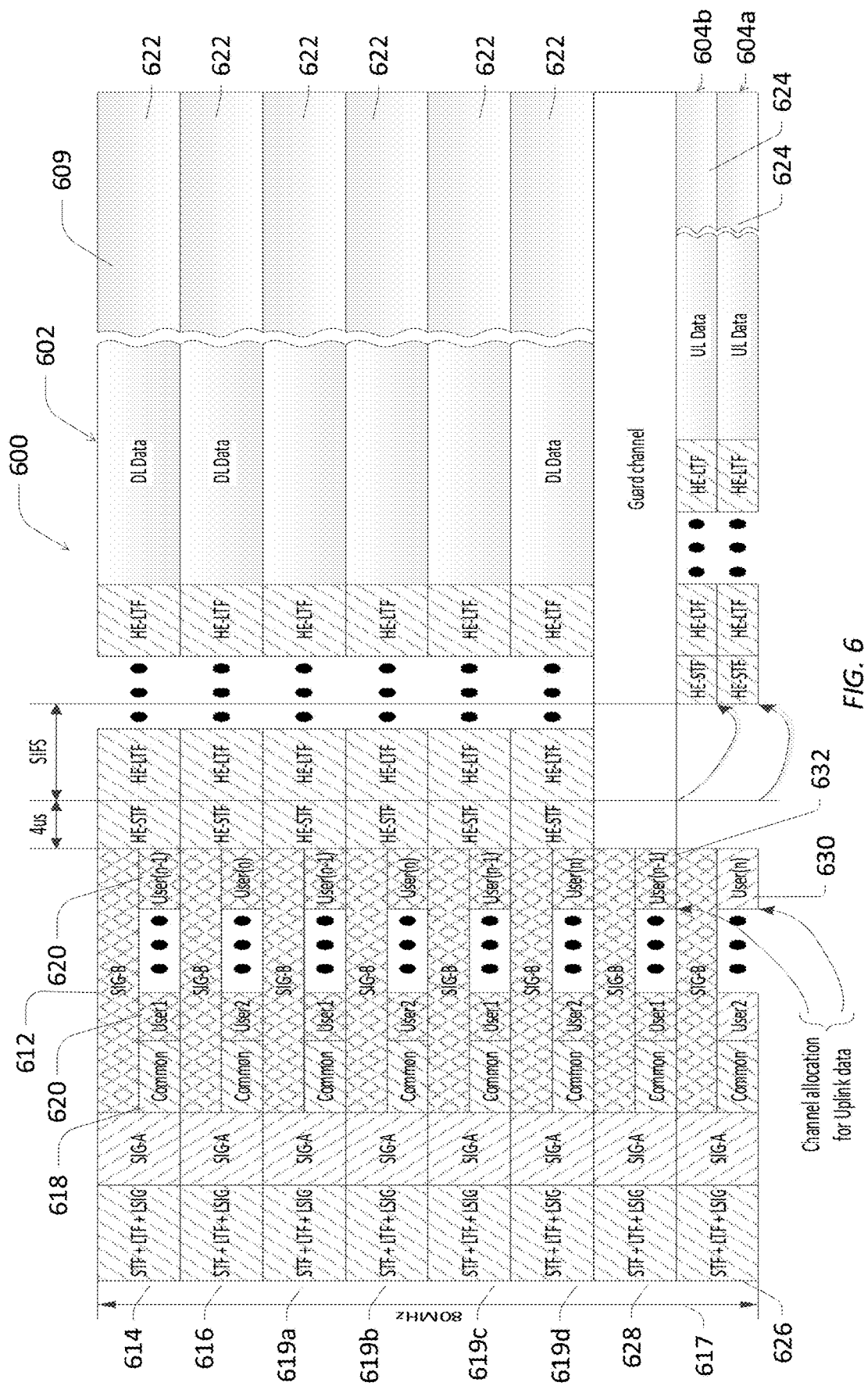
FIG. 6 is a diagram of an exemplary FDD communication in accordance with an aspect of the present disclosure, the diagram depicting frame formats of downlink and uplink components of the communication.

Exemplary embodiments of FDD transmissions in accordance with one or more aspects of the present disclosure are now described with reference to respective FIGS. 6, 7 and 8. FIG. 6 depicts an example of a communication 600 having a downlink frame 602 having a downlink payload 609 transmitted from AP 102 and two uplink frames 604*a,b* respectively transmitted by two client devices 104 (e.g. 104*a* and 104*b*). The communication is transmitted over an 80 MHz channel 617, having subcarriers that span resource units (RUs) 614, 616, 619, 626 and 628. The downlink frame includes HE-SIG-B field 612 having the same features of field HE-SIG-B field 512, the control of n stations are split so that adjacent RU (e.g. RU 614 and 616) respectively control stations allocated in odd numbered 20 MHz channels (1 to n−1) and stations allocated in even numbered channels (2 to n), n being an even number in the illustrated example. FIG. 6 shows the common field 618 and per station (per user) fields 620 within the SIG B field. The common field 618 and per user fields 620 and are illustrated as occupying only half of the bandwidth of the HE-SIG-A field. However, this is just for ease of illustration—the common field 618 and per user fields 620 in fact occupy the same bandwidth as HE-SIG-A. In communication 600, the downlink frame 602 includes downlink payloads 622, each of which is an aggregated MAC layer data unit. In the case of communication 600, each client station 104(*a,b*) calculates the period for transmitting the uplink frame, whereby their respective uplink payloads 624 are transmitted within the period in which the downlink payloads 622 are transmitted.

The period for transmitting the uplink frame is determined based on the length of the uplink frame divided by rate factor of 6 Mbits/sec, wherein the length is determined as follows:

Firstly, a transmission time of the downlink frame is calculated from the L-SIG duration field, whereby the transmission time is determined to be equal to the duration of the legacy preamble (i.e. 20 μs)+(L-SIG length/the rate factor of 6 Mbps).

Next, an amount of time is counted from the beginning of the downlink frame until the start of the uplink frame, which in this embodiment is the start of uplink HE-STF field. Each client device commences an uplink transmission a known delay (an adjustably configured time, or fixed time that is preset), after HE-SIG-B is fully received. Therefore, the start of the HE-STF field in the uplink transmission is determined based on the known end of the HE-STF field in the downlink transmission. The known delay, in some embodiments, is an SIFS (16 μs). Thus the start of the uplink frame can be determined by determining the end of the HE-STF field and adding the known delay. The duration of the uplink frame transmission is then determined to be the transmission time of the downlink frame minus the counted time until the start of the uplink frame.

In the exemplary embodiment of FIG. 6, for illustrative purposes it is assumed that user n is intended to correspond to client device 104*a* and user n−1 is intended to correspond with client device 104*b*, and each of devices 104*a,b* are to be allocated with respective RUs for an uplink transmission. For such a situation, the downlink frame 602 includes trigger and duration data for the client devices 604*a* and 604*b* on downlink RUs 626 and 628 respectively. The Association ID (AID) of client device 104*a* is included in the STA/user (n) specific field 630 on RU 626, and the AID of client device 104*b* is included in the user (n−1) field 632 on resource unit 628. The respective direction subfields in the user(n) field 630 and user (n−1) field 632 are each set for uplink triggering. Additionally, the user(n) field 630 is set to allocate an RU for an uplink frame 604*a*. The user(n) field 632 is set to allocate an RU for an uplink frame 604*b*.

The client device 104*a* upon decoding each of the HE-SIG-B fields identifies its AID in user field 630 and that the trigger mode has been selected. In response, the client device 104*a* transmits an uplink payload in the frame 604*a*, on its allocated RU. The client device 104*b* upon decoding each of the HE-SIG-B fields identifies its AID in user field 632 and that the trigger mode has been selected. In response, the client device 104*b* transmits an uplink payload in the frame 604*b*, on its allocated RU.

Figure 7:
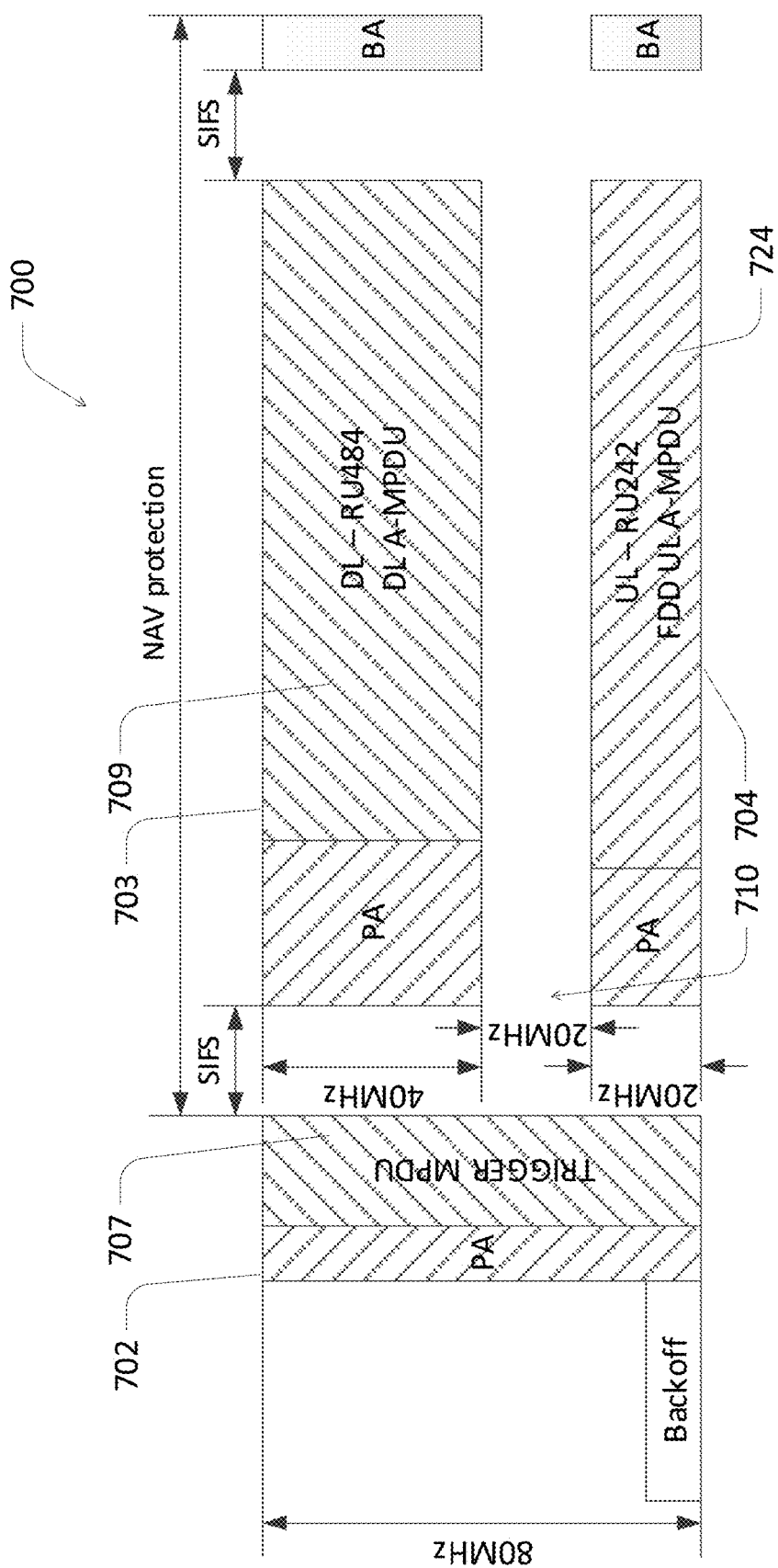
FIG. 7 is a diagram of another exemplary FDD communication in accordance with an aspect of the present disclosure, in which a trigger MPDU is included in a frame of the transmission.

FIG. 7 depicts another example of a communication 700 having a first downlink frame 702 and, an SIFS later, a second downlink frame 703 having a downlink payload 709 transmitted from AP 102. The first frame 702 is, in this case, a trigger frame which allocates an RU (in this example having 242 subcarriers) to one of the client devices 104 (e.g. device 104*c*) to configure that device 104*c* to transmit an uplink frame 704 having an uplink payload 724 an SIFS after the first frame. The duration of the uplink frame is determined as a length, i.e. number of bits for a defined bit rate, and that length is determined to be equal to the value in the length field within the common information field of the trigger MPDU 707 in the trigger frame 702.

The rest of the subcarriers remain unallocated in the trigger frame. However, an SIFS after the first frame 702, the AP 102 transmits a second downlink frame having an MPDU, on a resource unit having 484 of the subcarriers that were not allocated by the trigger frame. The downlink subcarriers are selected to be spaced from the uplink subcarriers so that there is a guard channel 710, which in the illustrated embodiment is a 20 MHz guard channel. Because the downlink frame 703 is transmitted an SIFS after the trigger frame, the downlink frame is transmitted at the same time as the uplink frame 704. Further the duration of MAC transmit module 336 generates an MPDU/A-MPDU having a size such that the downlink frame 703 having the MDPU/A-MPDU is at least as long as the uplink frame 704. This ensures that medium protection is maintained.

Figure 8:
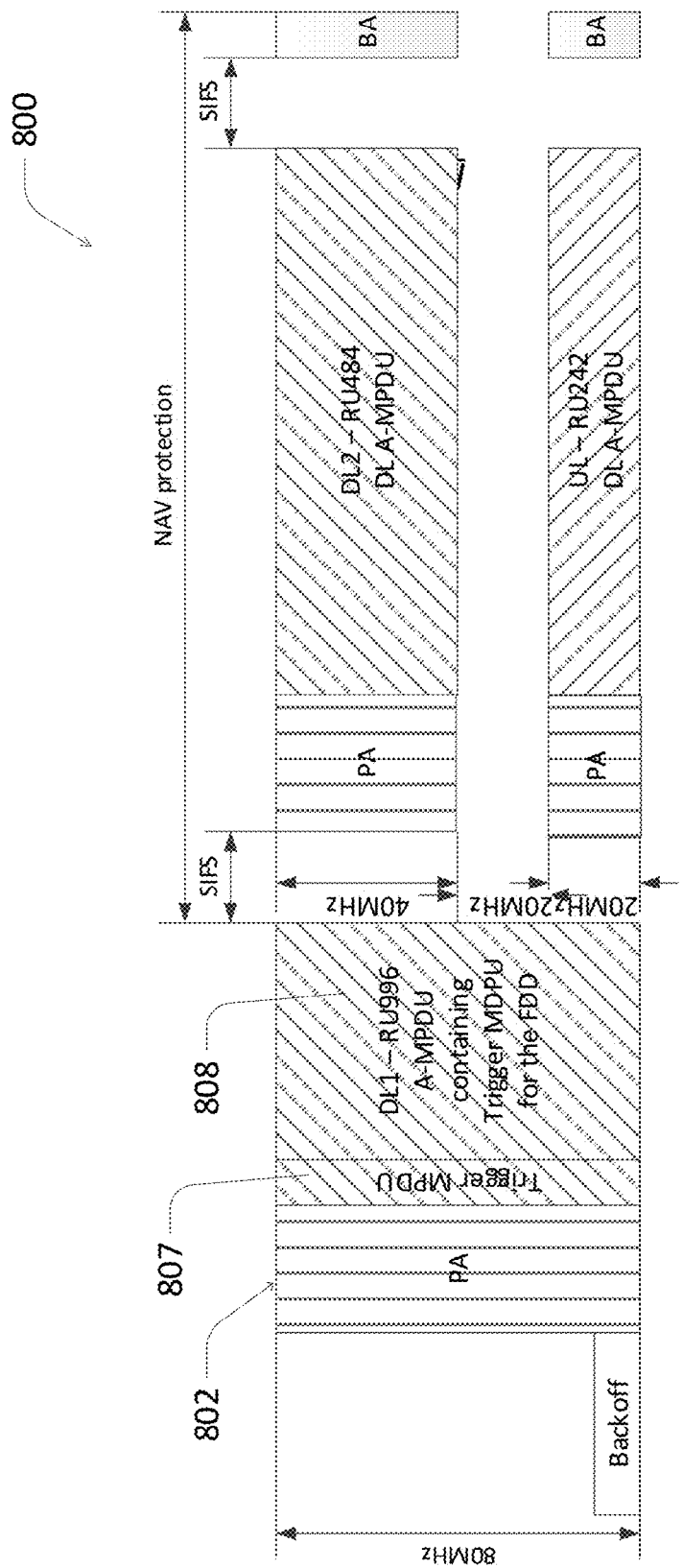
FIG. 8 is a diagram of yet another exemplary FDD communication in accordance with an aspect of the present disclosure, in which an A-MPDU having a trigger MPDU is included in a frame of the transmission.

FIG. 8 illustrates a further exemplary embodiment communication 800, which operates in the same manner as communication 700, except that that the first frame 802, rather than being a trigger frame has an A-MPDU payload 808 that includes a trigger MPDU 807.

Figure 9:
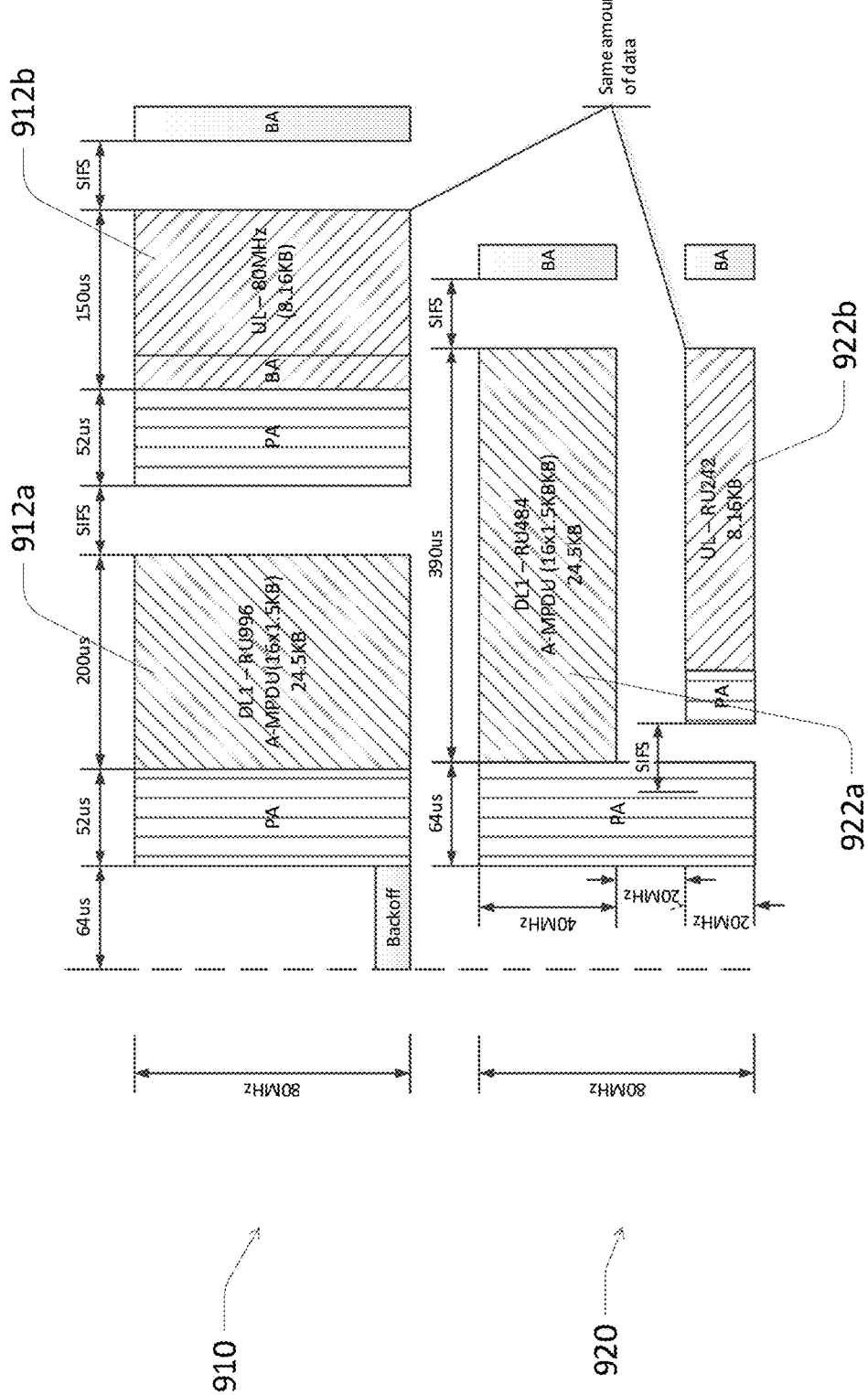
FIG. 9 is a diagram comparing a time division duplexing communication with a frequency division duplexing communication that is in accordance with an aspect of the present disclosure.

At least one benefit of the present disclosure may be appreciated with reference to FIG. 9, which compares a time-division duplexing (TDD) WLAN communication 910, having a downlink payload 912a and an uplink payload 912b, with an FDD duplexed communication 920, having a downlink payload 922a and an uplink payload 922b. The amount of data in the respective downlink payloads 912a and 922a are the same and the amount of data in the respective uplink payloads 912b and 922b are the same. As can be seen from FIG. 9, the amount of time to communicate payloads 922 by FDD is less than for communicating payloads 912 by TDD.

It is to be understood that the disclosure is not necessarily limited in its application to the details of construction and the arrangement of the components and/or methods set forth in the above description and/or illustrated in the drawings and/or the Examples. The disclosure is capable of other embodiments or of being practiced or carried out in various ways.

The present disclosure may be embodied as a system, a method, and/or a computer program product. The computer program product may include a computer readable storage medium (or media) having computer readable program instructions thereon for causing a processor to carry out aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A device for use in a wireless network, the device comprising:
  at least one processor configured to:
    generate duration data for determining a duration of a time interval; and
    instruct a transmission, via the wireless network, of:
      the duration data;
      a downlink payload comprising an aggregated media access control (MAC) layer data unit, the downlink payload being instructed for transmission on first subcarriers; and a trigger that is configured to configure at least one other device on the wireless network to transmit an uplink payload: within the time interval, during at least part of the transmission of the downlink payload, and on second subcarriers that are at different frequencies to the first subcarriers,
wherein the trigger is configured to trigger the uplink payload to be transmitted during a downlink frame that comprises the trigger and the downlink payload.

2. The device according to claim 1, wherein the at least one processor is configured to instruct the transmission of the trigger in a first frame, the first frame spanning a bandwidth that comprises the first subcarriers and the second subcarriers.

3. The device according to claim 2, wherein the first frame comprises a trigger aggregated MAC protocol data unit (trigger MPDU) that comprises the trigger.

4. The device according to claim 1, wherein the first subcarriers and the second subcarriers are configured to be separated to provide a guard channel between uplink and downlink transmissions.

5. The device according to claim 1, wherein the at least one processor is further configured to receive an uplink frame comprising the triggered uplink payload concurrently with transmitting a downlink frame comprising the downlink payload.

6. The device according to claim 1, wherein the at least one processor is further adapted to:
instruct transmission of transmission initiation data that indicates a wireless local area network (WLAN) frame is being transmitted, wherein the WLAN frame comprises the trigger, and wherein the transmission initiation data is configured to be transmitted in a WLAN legacy preamble.

7. A device for use in a wireless network, the device comprising:
at least one processor configured to:
receive from an initiating device, via the wireless network:
duration data for determining a duration of a time interval;
a downlink payload comprising an aggregated media access control (MAC) layer data unit, the downlink payload being received on first subcarriers; and
a trigger aggregated MAC protocol data unit (trigger MPDU) received on a bandwidth that comprises the first subcarriers and second subcarriers, the trigger MPDU comprising a trigger, the trigger specifying transmission of an uplink payload on the second subcarriers; and
based on the received trigger and the received duration data, instruct transmission, on the wireless network, of the uplink payload within the time interval, and during at least part of the reception of the downlink payload, the transmission of the uplink payload being on the second subcarriers that are at different frequencies to the first subcarriers.

8. The device according to claim 7, wherein the at least one processor is configured to finish the transmission of the uplink payload no later than the transmission of the downlink payload.

9. The device according to claim 7, wherein the at least one processor is configured to commence an uplink transmission comprising the uplink payload at a set time after receiving a frame field that comprises the trigger MPDU.

10. The device according to claim 7, wherein the at least one processor is configured to: commence an uplink transmission comprising the uplink payload at a set time after receiving a first frame, the first frame comprising the trigger MPDU.

11. A method for communicating between a device and at least one other device in a wireless network, the method comprising:
generating, at the device, duration data for determining a duration of a time interval; and
instructing, at the device, a transmission of:
the duration data;
a downlink payload comprising an aggregated media access control (MAC) layer data unit, the downlink payload being transmitted on first subcarriers; and
a trigger aggregated MAC protocol data unite (trigger MPDU), the trigger MPDU being transmitted on a bandwidth comprising the first subcarriers and second subcarriers, the trigger MPDU comprising a trigger that is configured to configure the at least one other device to transmit an uplink payload within the time interval, during at least part of the transmission of the downlink payload, and on second subcarriers that are at different frequencies to the first subcarriers.

12. A non-transitory computer readable medium comprising a program code, the program code being configured such that a computer performs the method according to claim 11 upon the program code being executed on the computer.

13. A method for communicating with an initiating device in a wireless network, the method comprising:
receiving from the initiating device:
duration data for determining a duration of a time interval;
a downlink payload comprising an aggregated media access control (MAC) layer data unit, the downlink payload being received on first subcarriers; and
a trigger aggregated MAC protocol data unite (trigger MPDU), the trigger MPDU being received on a bandwidth comprising the first subcarriers and second subcarriers, the trigger MPDU comprising a trigger, the trigger specifying transmission of an uplink payload on the second subcarriers; and
based on the received trigger and duration data, instructing transmission of the uplink payload within the time interval, during at least part of the reception of the downlink payload, and on the second subcarriers that are at different frequencies to the first subcarriers.

14. A non-transitory computer readable medium comprising a program code, the program code being configured such that a computer performs the method according to claim 13 upon the program code being executed on the computer.

* * * * *

UNITED STATES PATENT AND TRADEMARK OFFICE
CERTIFICATE OF CORRECTION

PATENT NO. : 11,363,632 B2
APPLICATION NO. : 16/887820
DATED : June 14, 2022
INVENTOR(S) : Epstein et al.

Page 1 of 2

It is certified that error appears in the above-identified patent and that said Letters Patent is hereby corrected as shown below:

In the Claims

Claim 1: Column 21, Line 1: "a trigger that is configured to configure at least one" should read -- a trigger that is adapted to configure at least one --.

Claim 1: Column 21, Line 3: "an uplink payload: within the time interval, during" should read -- an uplink payload, such that the uplink payload transmission is: within the time interval, during --.

Claim 1: Column 21, Line 7: "wherein the trigger is configured to trigger the uplink" should read -- wherein the trigger is configured to cause the uplink --.

Claim 7: Column 21, Lines 48-51: "a trigger aggregated MAC protocol data unit (trigger MPDU) received on a bandwidth that comprises the first subcarriers and second subcarriers, the trigger MPDU comprising a trigger, the trigger" should read -- an aggregated MAC protocol data unit (MPDU) received on a bandwidth that comprises the first subcarriers and second subcarriers, the MPDU comprising a trigger, the trigger --.

Claim 7: Column 21, Lines 54-55: "based on the received trigger and the received duration data, instruct transmission, on the wireless network," should read -- based on the trigger and the duration data received from the initiating device, instruct transmission, on the wireless network, --.

Claim 9: Column 22, Line 8: "receiving a frame field that comprises the trigger MPDU." should read -- receiving a frame field that comprises the MPDU. --.

Claim 10: Column 22, Line 12: "receiving a first frame, the first frame comprising the trigger" should read -- receiving a first frame, the first frame comprising the --.

Claim 11: Column 22, Lines 23-24: "a trigger aggregated MAC protocol data unite (trigger MPDU), the trigger MPDU being transmitted on a" should read -- an aggregated MAC protocol data unit (MPDU), the MPDU being transmitted on a --.

Signed and Sealed this
Nineteenth Day of December, 2023

Katherine Kelly Vidal
*Director of the United States Patent and Trademark Office*

CERTIFICATE OF CORRECTION (continued)
U.S. Pat. No. 11,363,632 B2

Claim 11: Column 22, Lines 26-27: "ond subcarriers, the trigger MPDU comprising a trigger that is configured to configure the at least one" should read -- ond subcarriers, the MPDU comprising a trigger that is adapted to configure the at least one --.

Claim 13: Column 22, Lines 44-45: "a trigger aggregated MAC protocol data unite (trigger MPDU), the trigger MPDU being received on a" should read -- an aggregated MAC protocol data unit (MPDU), the MPDU being received on a --.

Claim 13: Column 22, Line 47: "ond subcarriers, the trigger MPDU comprising a" should read -- ond subcarriers, the MPDU comprising a --.

Claim 13: Column 22, Line 50: "based on the received trigger and duration data, instruct-" should read -- based on the trigger and the duration data received from the initiating device, instruct- --.